(12) United States Patent
Yang et al.

(10) Patent No.: US 8,302,493 B2
(45) Date of Patent: Nov. 6, 2012

(54) TESTING SYSTEM FOR FLIP TYPE ELECTRONIC DEVICE

(75) Inventors: Ying Yang, Shenzhen (CN); Ling-Yu Huang, Shenzhen (CN); Yan-Feng Yang, Shenzhen (CN); Zhan-Wei Huang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 373 days.

(21) Appl. No.: 12/760,655

(22) Filed: Apr. 15, 2010

(65) Prior Publication Data

US 2011/0154917 A1    Jun. 30, 2011

(30) Foreign Application Priority Data

Dec. 25, 2009    (CN) .......................... 2009 1 0312314

(51) Int. Cl.
*G01L 5/00*    (2006.01)
(52) U.S. Cl. ................................. 73/862.381
(58) Field of Classification Search ............. 73/862.381, 73/810
See application file for complete search history.

(56) References Cited

U.S. PATENT DOCUMENTS 7,003,333 B2 *    2/2006    Chow et al. ................ 455/575.3
7,757,566 B2 *    7/2010    Li et al. ......................... 73/810

* cited by examiner

*Primary Examiner* — Lisa Caputo
*Assistant Examiner* — Octavia Davis-Hollington
(74) *Attorney, Agent, or Firm* — Altis Law Group, Inc.

(57) ABSTRACT

A testing system is used to testing a flip type electronic device having a main body, and a cover. The testing system includes a fixing structure, a flipping structure, a sensing device, a rotating mechanism, and a control device. The fixing structure positions the main body. The fixing structure flips the cover until a rotation degree of the cover and the main body reaches a threshold degree. The sensing device senses is pressed by the cover when the cover automatically rotates relative to the main body and generates electrical pressure signals according to the mount of pressure. The control device controls the rotating mechanism to drive the flipping structure to rotate and judges whether the flipping performance of the electronic device is normal according to the electrical pressure signals.

12 Claims, 4 Drawing Sheets

TESTING SYSTEM FOR FLIP TYPE ELECTRONIC DEVICE

BACKGROUND

1. Technical Field

The disclosure generally relates to testing systems, particularly to a testing system for testing flipping performance of a flip type electronic device.

2. Description of Related Art

With development of wireless communication technology and information processing technologies, portable electronic devices such as mobile phones, are now in widespread use. Since the flip type electronic devices are small and conveniently carried, people like flip type electronic devices.

Commonly, a flip type electronic device includes a main body, a cover, and a hinge rotatably connected the main body and the cover. With some flip type electronic devices, when the rotation degree of the main body and the cover reaches a threshold degree, the cover can automatically continue rotating relative to the main body to an end degree.

However, test flipping of covers is done manually, and results recorded according to a tester's observations. Therefore, the test result may be not accurate, and test efficiency low.

Therefore, there is room for improvement within the art.

BRIEF DESCRIPTION OF THE DRAWINGS

Many aspects of the testing system can be better understood with reference to the following drawings. The components in the drawings are not necessarily drawn to scale, the emphasis instead being placed upon clearly illustrating the principles of the testing system.

DETAILED DESCRIPTION

Figure 1:
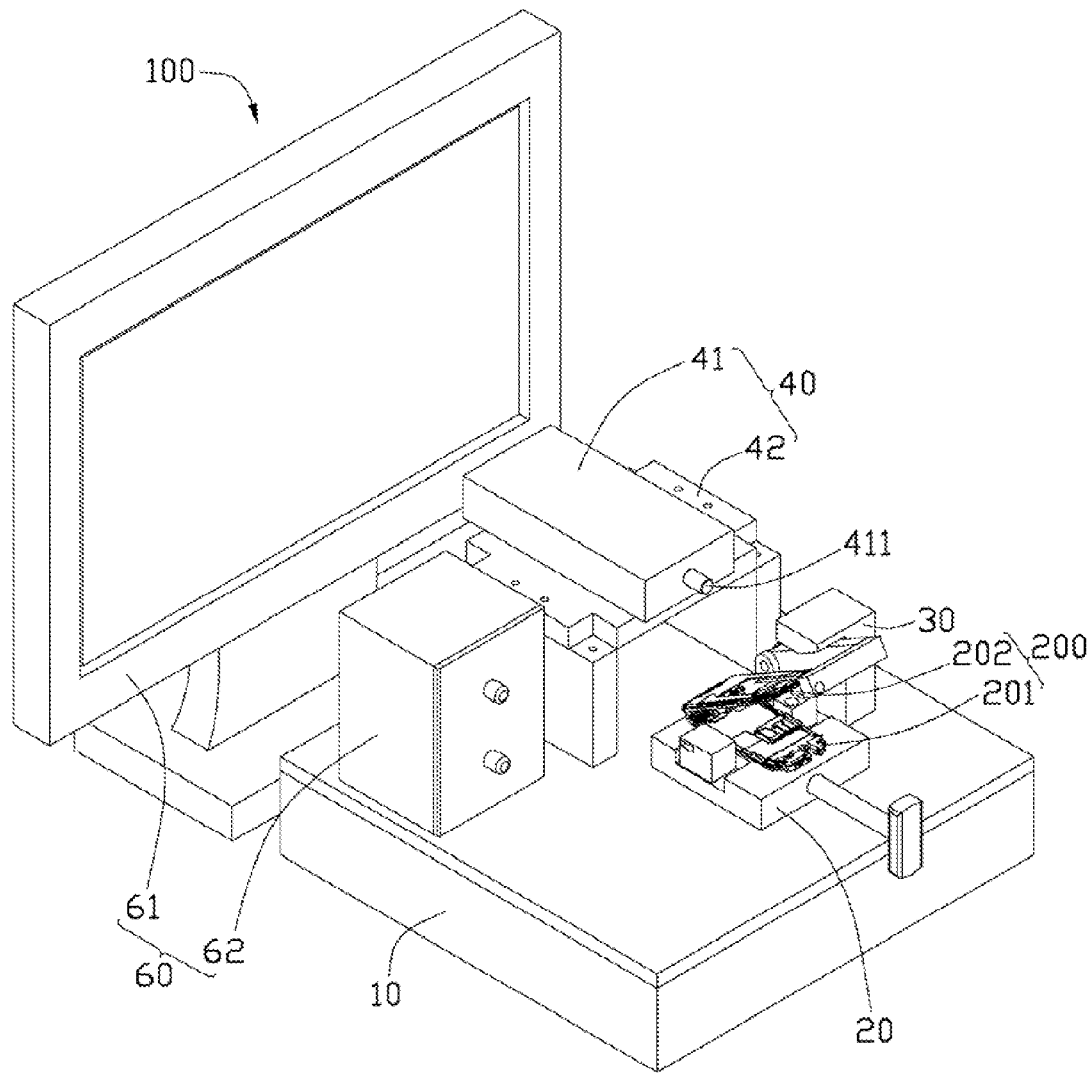
FIG. 1 is a schematic view of a testing system, according to one exemplary embodiment, showing a flip type electronic device being tested.
Figure 2:
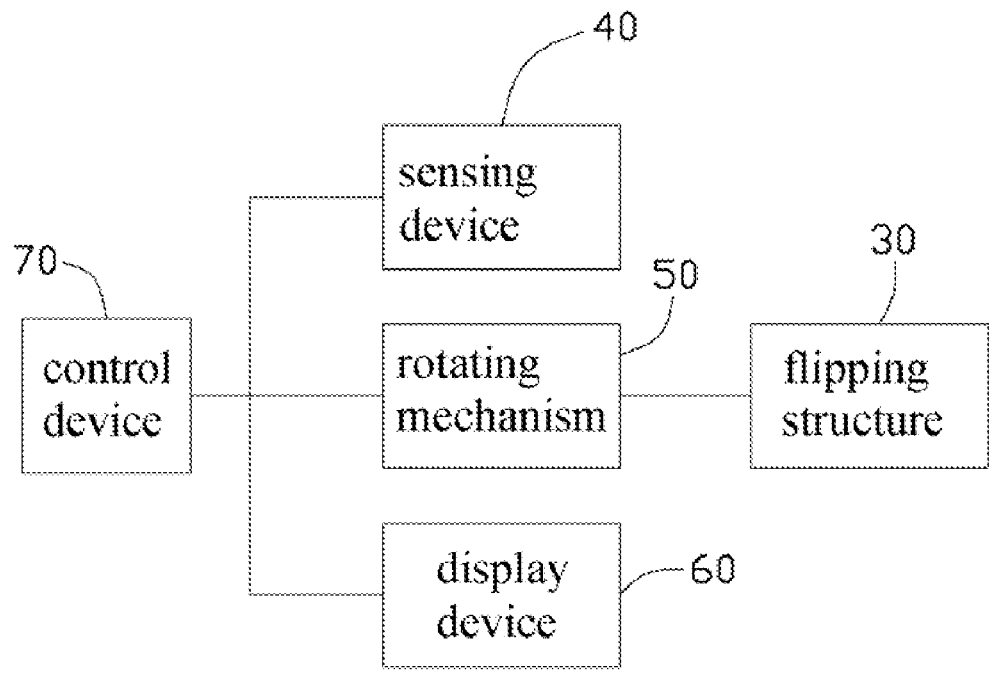
FIG. 2 is a schematic view of a rotate mechanism, a plurality of electronic devices, and a flipping structure of the testing system of FIG. 1.

Referring to FIGS. 1 and 2, a testing system 100 according to one exemplary embodiment, is used to test a flip type electronic device 200. The electronic device 200 includes a main body 201, a cover 202, and a hinge (not labeled) rotatably connecting the main body 201 and the cover 202. When a rotation degree of the cover 202 and the main body 201 reaches a threshold degree by manually flipping the cover 202, the cover 202 can automatically continue to rotate relative to the main body 201 to an end degree by a driving structure (not shown) such as springs. The testing system 100 includes a base 10, a fixing structure 20, a flipping structure 30, a sensing device 40, a rotating mechanism 50, a display device 60, and a control device 70.

The fixing structure 20, the flipping structure 30, and the sensing device 40 are fixed on the base 10.

Figure 3:
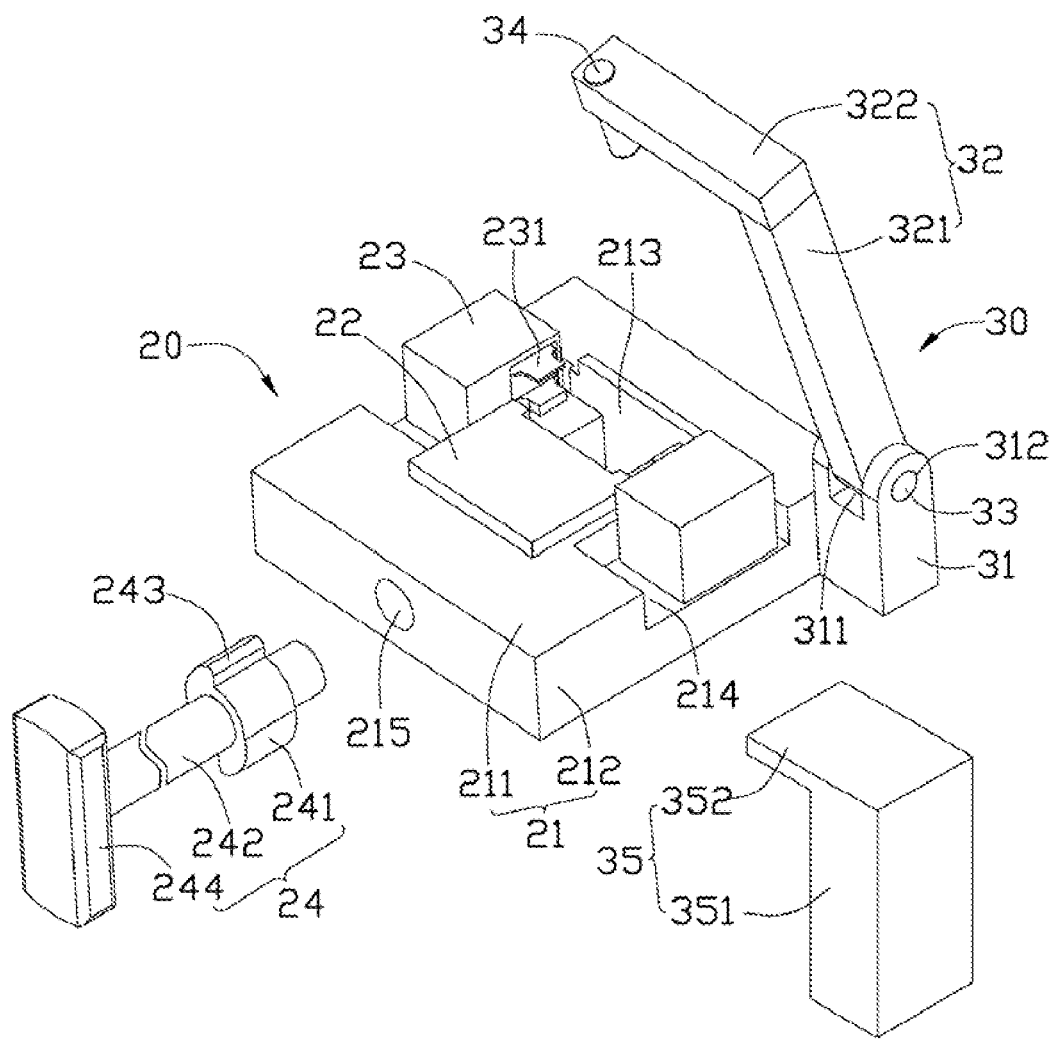
FIG. 3 is an exploded, schematic view of a fixing structure and the flipping structure of the testing system of FIG. 1.
Figure 4:
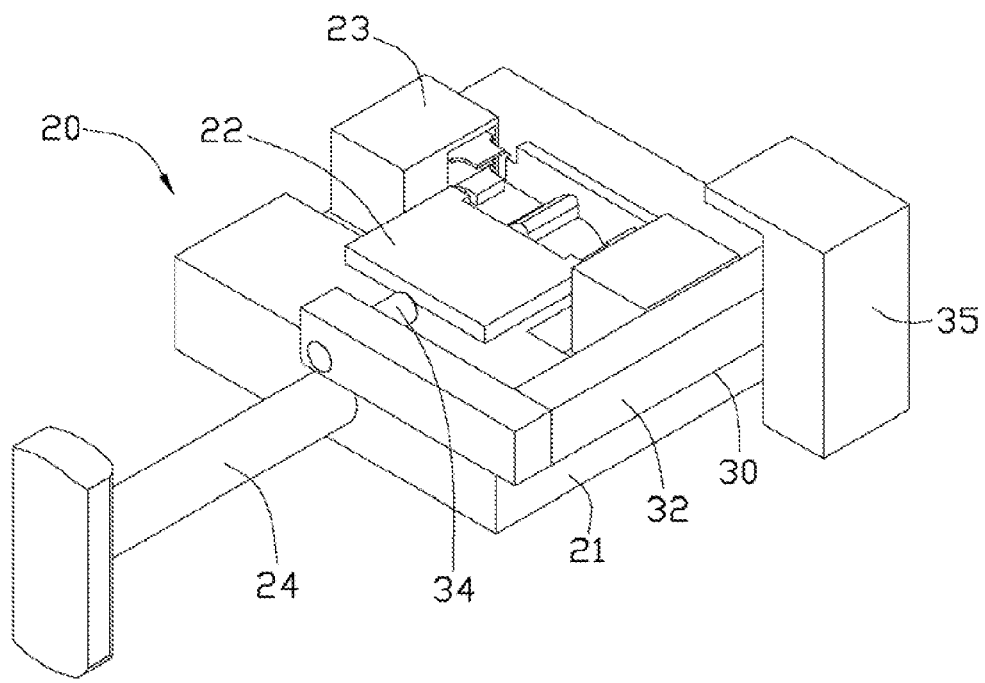
FIG. 4 is an assembled, schematic view of the fixing structure and the flipping structure shown in FIG. 3.

Referring to FIGS. 3 and 4, the fixing structure 20 includes a core structure 21, a flat board 22, two positioning members 23, and a latching member 24.

The core structure 21 includes a mounting surface 211 and four side surfaces 212 connected perpendicular to the mounting surface 211. A rectangular receiving chamber 213 is defined in the center of the mounting surface 211. Two mounting notches 214 are defined in the mounting surface 211, respectively at two sides of the receiving chamber 213. A hole 215 is defined in one side of the side surface 212 and communicates with the receiving chamber 213. A rib (not labeled) protrudes from the mounting surface 211 at one side of the receiving chamber 213. The flat board 22 is positioned on the mounting surface 211 at one side of the receiving chamber 213, opposite to the rib. The main body 201 of the electronic device 200 can be placed on the flat board 22 and the rib.

Each positioning member 23 includes two spaced positioning tabs 231 protruded from one side thereof. The distance between the two positioning tabs 231 is substantially equal to the thickness of the main body 201. The main body 201 can be initially positioned by the two positioning tabs 231. The two positioning members 23 are fixed in the mounting notches 214 with the two positioning tabs 231 facing each other.

The latching member 24 includes a latching portion 241 and a pole 242. The latching portion 241 is cylindrical and made of flexible material. A mounting hole (not labeled) is defined through the center of the latching portion 241. Two latching ends 243 oppositely protrude from the circumference of the latching portion 241. The pole 242 is cylindrical. A holding end 244 is disposed on one end of the pole 242. The latching portion 241 is received in the receiving chamber 213. The pole 242 is inserted into the receiving chamber 213 through the hole 215. The latching portion 241 is fixed at one end of the pole 242 using the mounting hole. The latching end 243 can resist at one side of the main body 201 by rotating the pole 24, and latch the main body 201 with the upper positioning tabs 231.

The flipping structure 30 includes a fixing block 31, a flipping member 32, a pin 33, a rising member 34, and a stopping member 35. The fixing block 31 is positioned at one side of the core structure 21. One end of the fixing block 31 is fixed on the base 10. Another end of the fixing block 31 defines a receiving slot 311 along a longitudinal direction thereof and two mounting holes 312 communicating with the receiving slot 311.

The flipping member 32 includes a first flipping arm 321 and a second flipping arm 322 connected perpendicular to the first flipping arm 321. The first flipping arm 321 is rotatably mounted in the fixing block 31 by the pin 33. The rising member 34 is cylindrical, and fixed in the second flipping arm 322 using a through hole. The rising member 34 can be placed between the main body 201 and the cover 201. When the flipping member 32 rotates, the rising member 34 flips the cover 202. The cover 202 rotates relative to the main body 201.

The stopping member 35 includes a base body 351 and a stopping plate 352 connected perpendicular to the base body 351. The base body 351 is positioned at one side of the core structure 21 and fixed on the base 10. The stopping plate 352 faces the core structure 21. When the first flipping arm 321 meets the stopping plate 352, the stopping plate 352 stops the flipping member 32 from rotating. Accordingly, the rising member 34 stops flipping the cover 202. The cover 202, if working properly, separates from the rising member 34, and automatically rotates relative to the main body 201 using the driving structure therein. The rotation degree of the cover 202 and the main body 20 flipped by the rising member 34 can be adjusted to be the threshold degree by changing the height of the base body 351.

The sensing device 40 includes a sensor 41 and a shelf 42. The sensor 41 includes a sensing end 411. The sensor 41 is fixed on the shelf 42, and positioned at one side of the fixing structure 20 with the sensing end 411 facing the core structure 21. When the cover 202 automatically rotates relative to the main body 201 after separating from the rising member 34, the sensing end 411 is pressed by the cover 202 when enough rotation occurs. Then the sensor 41 sends electrical signals to the control device 70 according to the amount of pressure.

The rotating mechanism 50 (schematically shown only) is connected to the flipping structure 30 and the control device 70 (schematically shown only). The display device 60 includes a display 61 and an indicator 62 with light emitting diodes (LED). The control device 70 may be a computer connected to the sensing device 40, the rotating mechanism 50, and the display device 60. The control device 70 controls the rotating mechanism 40 to drive the flipping structure 30 to rotate, and obtains the electrical signals of the pressure from the sensing device 40, then judges whether the flipping performance of the electronic device 200 is normal according to the electrical signals, and then finally displays the judgment using the display 60.

In use, firstly, the main body 201 of the electronic device 200 is placed on the flat board 22, and positioned between the positioning tabs 231. The pole 242 is rotated to make the latching end 243 of the latching portion 24 resist at one side of the main body 201. The main body 201 is latched by the latching end 243 and the upper positioning tabs 231. Accordingly, the rising member 34 is placed between the main body 201 and the cover 202.

After that, the flipping member 30 is rotated by the rotating mechanism 50, and the rising member 34 flips the cover 202 until the first flipping arm 321 is stopped by the stopping plate 352, and the rotation degree of the main body 201 and the cover 202 reaches the threshold degree. Then, the cover 202 automatically further rotates relative to the main body, and presses the sensing end 411 of the sensor 41. The sensor 41 generates electrical pressure signals and sends the electrical pressure signals to the control device 70. The control device 70 judges whether the flipping performance of the electronic device 200 is normal according to the electrical pressure signals and displays the judgment using the display device 60. The test operated using the testing system 100 is convenient and efficient, and the result is accurate.

It is believed that the exemplary embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A testing system for a flip type electronic device having a main body and a cover, the testing system comprising:
    a fixing structure for positioning the main body of the electronic device;
    a flipping structure for flipping the cover of the electronic device until a rotation degree of the cover and the main body reaches a threshold degree;
    a sensing device pressed by the cover when the cover automatically rotates relative to the main body further than the threshold degree, the sensing device sensing the amount of pressure applied by the cover and generating electrical pressure signals according to the amount of pressure;
    a rotating mechanism; and
    a control device controlling the rotating mechanism to drive the flipping structure to rotate and judging whether the flipping performance of the electronic device is normal according to the electrical pressure signals from the sensing device.

2. The testing system as claimed in claim 1, wherein the fixing structure includes a core structure and at least one positioning member fixed on the core structure, two positioning tabs protrude from one side of the positioning member to position the main body.

3. The testing system as claimed in claim 2, wherein the fixing structure further includes a latching member mounted in the core structure, the latching member includes a latching portion and a pole, the latching portion is fixed at one end of the pole, at least one latching end protrudes from circumference of the latching portion, the latching end can resist at one side of the main body by the rotating the pole.

4. The testing system as claimed in claim 3, wherein the core structure includes a mounting surface and four side surfaces connected to the core structure, the core structure defines a receiving chamber in the center of the mounting surface, at least one mounting notch at one side of the receiving chamber, and a hole in one side surface communicating with the receiving notch, the latching portion is received in the receiving chamber, the positioning member is mounted in the mounting notch, the pole is inserted into the receiving chamber through the hole.

5. The testing system as claimed in claim 4, wherein the fixing structure further includes a flat board positioned on the mounting surface of at one side of the receiving chamber to place the main body on.

6. The testing system as claimed in claim 3, wherein the latching portion is flexible.

7. The testing system as claimed in claim 1, wherein the flipping structure includes a fixing block, a flipping member, a pin, a rising member, and a stopping member, the flipping member includes a first flipping arm and a second flipping arm perpendicularly connected to the first flipping arm, the first flipping arm is rotatably mounted in the fixing block by the pin, the rising member is fixed in the second flipping arm and placed between the main body and the cover during testing to flip the cover, the stopping member stops the flipping member from rotating when the rotation degree of the main body and the cover reaches the threshold degree.

8. The testing system as claimed in claim 7, wherein the stopping member includes a base body and a stopping plate perpendicularly connected to the base body, the base body is positioned at one side of the core structure and fixed on the base, the stopping plate is facing the core structure.

9. A testing system for a flip type electronic device having a main body and a cover, the testing system comprising:
    a fixing structure for positioning the main body of the electronic device;
    a flipping structure including a flipping member rotating and flipping the cover of the electronic device, and a stopping member stopping the flipping member from rotating when the rotation degree of the main body reaches a threshold degree;
    a sensing device pressed by the cover when the cover automatically rotates relative to the main body further than the threshold degree, the sensing device sensing the amount of pressure applied by the cover and generating electrical pressure signals according to the amount of pressure;
    a rotating mechanism; and
    a control device controlling the rotating mechanism to drive the flipping member to rotate and judging whether the flipping performance of the electronic device is normal according to the electrical pressure signals from the sensing device.

10. The testing system as claimed in claim 9, wherein the flipping member includes a first flipping arm and a second flipping arm perpendicularly connected to the first flipping arm.

11. The testing system as claimed in claim 9, wherein the flipping structure further includes a fixing block, a pin, and a rising member, the flipping member is rotatably mounted in the fixing block by the pin, the rising member is fixed in the second flipping arm and placed between the main body and the cover during testing to flip the cover.

12. The testing system as claimed in claim 9, wherein the stopping member includes a base body and a stopping plate perpendicularly connected to the base body, the base body is positioned at one side of the core structure and fixed on the base, the stopping plate is facing the core structure.

* * * * *